Patented Jan. 31, 1950

2,495,729

UNITED STATES PATENT OFFICE 2,495,729

METHOD OF REMOVING COATINGS FROM SURFACES

Canfield Hutson, James C. Kidd, and Carl E. Blair, Cumberland, Md., assignors to Celanese Corporation of America, a corporation of Delaware No Drawing. Application November 30, 1945, Serial No. 632,135

4 Claims. (Cl. 134—4)

This application is a continuation-in-part of our application S. No. 621,596, filed on October 10, 1945.

This invention relates to a cleaning method and relates more particularly to a method for aiding in the removal of paints, varnishes and adhesives of various types from painted and coated surfaces.

An object of this invention is the provision of an improved cleaning method particularly adapted for the softening and removal of paint coatings from surfaces to which paint has been applied.

Another object of this invention is to provide a paint, varnish, and adhesives softening method especially adapted to aid in the removal of coatings of paint, varnishes and adhesives from smooth surfaces, such as glass, woods, tile, metal and the like.

Other objects of this invention will appear from the following detailed description.

In removing paint coatings from painted surfaces, burning, chipping and scraping is often resorted to. However, such methods of removing the paint coatings are only practical when the painted surfaces cannot be permanently damaged by the flame, heat or the chipping tool. Moreover, such methods are laborious and relatively costly. Frequently, the paint is softened by a suitable agent or medium before removal. Softening of the paint not only reduces the labor required in the removal of the paint, but also is a requisite where the painted surfaces are brittle, such as surfaces of glass or ceramic tile, or where the painted surfaces are of a soft wood. To function efficaciously, the softening agent or medium should remain in contact with the paint coating long enough to exert the desired softening effect thereon. Where vertical surfaces are to be acted upon, the softening agent or medium tends to run off the surface, thus presenting a considerable problem.

We have now found a novel paint softening medium which is free from the foregoing and other disadvantages. In accordance with our invention, an improved paint removing agent which is highly active in softening widely different paint base materials may be prepared by combining certain solvent, softening and other components and, in addition, incorporating therein a film-forming base material which on application of the paint removing composition to the painted surface forms a thin film or skin over the paint removing composition. The incorporation of said film-forming base material in the novel paint removing agent of our invention greatly increases the efficiency of said agent. The film-forming base material not only permits close control of the precise area to which the agent is applied, but the film or skin which forms on the surface of the paint removing agent after it has been applied also enables the solvent and softening agents which are thereby confined within said film to exert their maximum softening and solvent action.

The film-forming base materials which may be incorporated in said paint removing agent in accordance with our invention may be cellulose esters, such as cellulose nitrate, cellulose acetate, cellulose propionate, cellulose butyrate, cellulose acetate-propionate and cellulose acetate-butyrate, as well as cellulose ethers, such as ethyl cellulose and benzyl cellulose. Other materials forming the desired thin film or skin on the surface of the paint removing agent may also be incorporated in said agent, such as paraffin wax.

In forming our novel paint, varnish, and adhesive removing composition, for example, 1.0 to 2.5 parts by weight of paraffin wax are dissolved in 5.5 to 9.0 parts by weight of benzene to which is then added 12.0 to 18.0 parts by weight of either a cyclic aliphatic oxide, such as tetramethylene oxide, or of a substantially equal mixture of aliphatic alcohols, such as, a mixture of propyl and butyl alcohol, or both. To this mixture is added 6.0 to 9.0 parts by weight of an aliphatic acid ester, such as, ethyl acetate, mixed with 14.0 to 22.0 parts by weight of a 25% solution of cellulose acetate in acetone, together with 0.6 to 0.9 parts by weight of a surface active agent such as, for example, a long chain alkyl benzene sulfonate or the diamyl, diisobutyl, dihexyl or dioctyl ester of sodium sulfosuccinic acid.

The benzene in said composition may be replaced by a mixture of halogenated aliphatic hydrocarbons such as, for example, a mixture of ethylene dichloride and carbon tetrachloride. When employing halogenated aliphatic hydrocarbons in place of benzene the surface active agent may be eliminated. The paint, varnish and adhesive-removing composition may comprise from 0.75 to 2.5 parts by weight of paraffin wax dissolved in a mixture of 10.0 to 16.0 parts by weight of carbon tetrachloride and 9.0 to 15.0 parts of ethylene dichloride to which is then added 6 to 9 parts by weight of a substantially equal mixture of propyl alcohol and butyl alcohol, 3.0 to 4.5 parts by weight of ethyl acetate and 32 to 40 parts by weight of a 25% solution of cellulose acetate in acetone.

As a paint removing composition it is applied to the painted surface from which it is desired to remove the paint, in any convenient manner, such as by spraying, brushing, dipping and the like. After a short period, say 1 to 30 minutes to allow for drying and the dissolution of the paint, the film produced is removed with a wide scraping blade and/or a wire brush. The paint comes away very easily and the film-forming base materials in the paint removing composition maintains the layer of paint which is removed in a substantially coherent form. This action not only permits easy removal of the paint but prevents smearing or running and avoids the dropping of softened paint about the area in which the work is being carried out.

When a slight film of pigment originally present in the coating is tenaciously held by the surface undergoing cleaning, as may occur where tar, asphalt or mastic base coating compositions are being removed, said residuary film may be removed by another application of the above compositions or preferably by the application of a film-forming composition containing a somewhat greater proportion of solvent liquids therein. Thus, the seconary cleaning composition or wash coat may comprise a mixture of 36.0 to 48.0 parts by weight of ethylene dichloride, 24.0 to 36.0 parts by weight of a substantially equal mixture of propyl alcohol and butyl alcohol, 7.5 to 11 parts by weight of carbon disulphide and 32.0 to 40.0 parts by weight of a 25% solution of cellulose acetate in acetone. A small amount of finely-divided pigment such as titanium oxide may also be included in the wash coat to aid in the removal of the last traces of tar, mastic or asphalt from the surface being cleaned.

In order further to illustrate our invention but without being limited thereto the following examples are given:

*Example I*

A composition comprising the following components is prepared as described:

| | Parts by weight |
|---|---|
| Benzene | 7.30 |
| Paraffin wax | 1.25 |
| Mixed propyl and butyl alcohol | 15.00 |
| Ethyl acetate | 7.50 |
| Acetone containing 25% of cellulose acetate | 18.00 |
| Aerosol OT (the dioctyl ester of sodium sulfosuccinic acid) | 0.75 |
| | 49.80 |

*Example II*

A composition comprising the following components is prepared as described:

| | Parts by weight |
|---|---|
| Benzene | 7.30 |
| Paraffin wax | 1.25 |
| Tetramethylene oxide | 15.00 |
| Ethyl acetate | 7.50 |
| Acetone containing 25% of cellulose acetate | 18.00 |
| Aerosol OT (the dioctyl ester of sodium sulfosuccinic acid) | 0.75 |
| | 49.80 |

The composition of either Example I or II is brushed on to a dried coating of an asphalt base paint which had previously been applied to a glass surface. After 3 minutes, in which time the film or skin forming ingredient of the paint removing composition, i. e. cellulose acetate, has partially dried and the softening medium has acted upon the coating of paint, the whole is removed with a wide-bladed scraping knife or spatula. A short brushing action with a wire brush completes the removal of the coating from depressions. The film of cellulose acetate formed over the whole concentrates the softening action on the paint and enables the latter to be removed in a substantially continuous coherent mass. The application of our novel paint removing composition produces a quick and clean paint removing action.

*Example III*

A composition comprising the following components is prepared as described:

| | Parts by weight |
|---|---|
| Acetone containing 25% of cellulose acetate | 36.00 |
| Ethyl acetate | 3.75 |
| Paraffin wax | 1.00 |
| Carbon tetrachloride | 12.00 |
| Ethylene dichloride | 11.00 |
| Propyl and butyl alcohols mixture | 7.35 |
| | 71.10 |

The composition above is brushed on to a tar-base painted glass surface and allowed to dry sufficiently to form a coherent surface film of cellulose acetate thereon. When the paint has softened, the whole is removed with a wide-bladed scraping knife. If some of the tar-base remains on the surface in the form of a thin, tinted film it may be completely removed by the application of a wash coat of the following composition:

| | Parts by weight |
|---|---|
| Acetone containing 25% of cellulose acetate | 36.00 |
| Titanium oxide | 0.43 |
| Carbon disulphide | 9.00 |
| Ethylene dichloride | 44.00 |
| Propyl and butyl alcohols mixture | 29.40 |
| | 118.83 |

When the film formed on application of this wash coat is scraped away a perfectly clean glass surface is obtained.

It is to be understood that the foregoing detailed description is given merely by way of illustration and that many variations may be made therein without departing from the spirit of our invention.

Having described our invention, what we desire to secure by Letters Patent is:

1. Process for the removal of dried paint, varnishes and adhesives from coated surfaces, which comprises applying thereto to form a film thereon a mixture of 32 to 40 parts by weight of a 25% solution of cellulose acetate in acetone, 0.75 to 2.5 parts by weight of paraffin wax, 10.0 to 16.0 parts by weight of carbon tetrachloride, 9.0 to 15.0 parts by weight of ethylene dichloride, 6 to 9 parts by weight of a substantially equal mixture of propyl alcohol and butyl alcohol and 3.0 to 4.5 parts by weight of ethyl acetate, removing the softened paint, varnish or adhesion together with the cellulose acetate film formed thereon, and applying to the surface a wash coat comprising a film-forming material having a basis of a derivative of cellulose, selected from the group consisting of cellulose esters and cellulose ethers dissolved in a mixture of acetone, carbon disulphide, ethylene dichloride, propyl alcohol and butyl alcohol and removing the film formed thereon.

2. Process for the removal of dried paint, varnishes and adhesives from coated surfaces, which comprises applying thereto to form a film thereon a mixture of 32 to 40 parts by weight of a 25% solution of cellulose acetate in acetone, 0.75 to 2.5 parts by weight of paraffin wax, 10.0 to 16.0 parts by weight of carbon tetrachloride, 9.0 to 15.0 parts by weight of ethylene dichloride, 6 to 9 parts by weight of a substantially equal mixture of propyl alcohol and butyl alcohol and 3.0 to 4.5 parts by weight of ethyl acetate, removing the softened paint, varnish or adhesive together with the cellulose acetate film formed thereon, and applying a wash coat, comprising cellulose acetate dissolved in a mixture of acetone, carbon disulphide, ethylene dichloride, propyl alcohol and butyl alcohol.

3. Process for the removal of dried paint, varnishes and adhesives from coated surfaces, which comprises applying thereto to form a film thereon a mixture of 32 to 40 parts by weight of a 25% solution of cellulose acetate in acetone, 0.75 to 2.5 parts by weight of paraffin wax, 10.0 to 16.0 parts by weight of carbon tetrachloride, 9.0 to 15.0 parts by weight of ethylene dichloride, 6 to 9 parts by weight of a substantially equal mixture of propyl alcohol and butyl alcohol and 3.0 to 4.5 parts by weight of ethyl acetate, removing the softened paint, varnish or adhesive together with the cellulose acetate film formed thereon, applying a wash coat comprising 32.0 to 40.0 parts by weight of a 25% solution of film forming cellulose acetate in acetone, 36.0 to 48.0 parts by weight of ethylene dichloride, 24.0 to 36.0 parts by weight of a substantially equal mixture of propyl alcohol and butyl alcohol and 7.5 to 11.0 parts by weight of carbon disulphide, and removing the traces of the paint, varnish or adhesive together with the cellulose acetate film formed thereon.

4. Process for the removal of dried paint, varnishes and adhesives from coated surfaces, which comprises applying thereto to form a film thereon a mixture of 32 to 40 parts by weight of a 25% solution of cellulose acetate in acetone, 0.75 to 2.5 parts by weight of paraffin wax, 10.0 to 16.0 parts by weight of carbon tetrachloride, 9.0 to 15.0 parts by weight of ethylene dichloride, 6 to 9 parts by weight of a substantially equal mixture of propyl alcohol and butyl alcohol and 3.0 to 4.5 parts by weight of ethyl acetate, removing the softened paint, varnish or adhesive together with the cellulose acetate film formed thereon, applying a wash coat comprising 32.0 to 40.0 parts by weight of a 25% solution of film forming cellulose acetate in acetone, 36.0 to 48.0 parts by weight of ethylene dichloride, 24.0 to 36.0 parts by weight of a substantially equal mixture of propyl alcohol and butyl alcohol, 0.375 to 0.5 parts by weight of titanium oxide and 7.5 to 11.0 parts by weight of carbon disulphide, and removing the traces of the paint, varnish or adhesive together with the cellulose acetate film formed thereon.

CANFIELD HUTSON.
JAMES C. KIDD.
CARL E. BLAIR.

REFERENCES CITED

The following references are of record in the file of this patent:

UNITED STATES PATENTS

| Number | Name | Date |
| --- | --- | --- |
| 1,049,467 | Ellis | Jan. 7, 1913 |
| 1,143,878 | Alexander | June 22, 1915 |
| 1,173,628 | Wilson et al. | Feb. 29, 1916 |
| 1,993,096 | Hodges | Mar. 5, 1935 |